United States Patent [19]

Hayes

[11] Patent Number: 5,362,798

[45] Date of Patent: Nov. 8, 1994

[54] LOW-FORMALDEHYDE LATEX BINDER

[75] Inventor: Peter C. Hayes, Stow, Ohio

[73] Assignee: GenCorp Inc., Fairlawn, Ohio

[21] Appl. No.: 36,300

[22] Filed: Mar. 24, 1993

[51] Int. Cl.$^5$ .................. C08L 3/00; C08L 33/00
[52] U.S. Cl. .................. 524/558; 524/522; 524/523; 524/560; 526/316; 428/288; 428/290; 428/507; 428/511
[58] Field of Search .............. 524/523, 522, 558, 560, 524/567, 559; 428/288, 290, 507, 571; 526/316, 318, 318.25, 321

[56] References Cited

U.S. PATENT DOCUMENTS

| | | | |
|---|---|---|---|
| 4,966,791 | 10/1990 | Kissel et al. | 428/288 |
| 5,028,655 | 7/1991 | Stack | 524/522 |
| 5,030,507 | 7/1991 | Mudge et al. | 428/288 |
| 5,143,954 | 9/1992 | Hutton et al. | 524/106 |

OTHER PUBLICATIONS

An article entitled "The Condensation Products of Aldehydes and Aldol-sensitive β-Dicarbonyl Compounds $^{1a}$," B. D. Wilson, Feb., 1963, vol. 28, pp. 314–320.

Primary Examiner—Paul R. Michl
Assistant Examiner—LaVonda R. DeWitt
Attorney, Agent, or Firm—Robert F. Rywalski; Daniel J. Hudak

[57] ABSTRACT

A latex binder which has very low or nil amounts of aldehyde such as formaldehyde is made utilizing a compound having the formula:

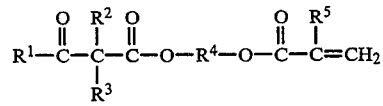

wherein $R^1$ is generally an alkyl having from 1 to 6 carbon atoms, with methyl being preferred; wherein $R^2$ and $R^3$, independently, is preferably hydrogen, or allyl, or an alkyl having from 1 to 12 carbon atoms, or an alkyl-substituted aromatic having from 7 to 15 carbon atoms, wherein $R^4$ is an alkylene having from 1 to 4 carbon atoms, with ethylene being preferred; and wherein $R^5$ is hydrogen or an alkyl having from 1 to 4 carbon atoms, with methyl being preferred. The latex binder is generally an emulsion or latex copolymer made from at least one or more conjugated dienes having a total of from 4 to 10 carbon atoms with butadiene being preferred and one or more vinyl-substituted aromatics having from 8 to 14 carbon atoms, with styrene being preferred. The amount of the above formulation compound is generally from at least 0.05 to about 7 parts by weight based upon 100 parts by weight of the one or more conjugated dienes and the vinyl-substituted aromatic monomers. The latex binder is generally free of crosslinking agents, has good stability, and can be used to bind a paper-coating composition to a cellulose substrate, or to bind nonwoven fibers together. The latex binder generally contains 10 parts or less by weight of formaldehyde per million parts by weight and desirably contains nil, that is, no detectable amounts of formaldehyde therein, even after extended periods of time. e.g., 28 days.

25 Claims, No Drawings

LOW-FORMALDEHYDE LATEX BINDER

FIELD OF INVENTION

The present invention relates to very low formaldehyde latex binders which desirably are copolymerized with small amounts of acetoacetoxyethyl methacrylate compounds.

BACKGROUND

Heretofore, latex binders have been used in a wide variety of applications such as paper towels and feminine hygiene products, to adhere a paper coating to a cellulose substrate, in carpet and rug backings, and for binding nonwoven fibers together. However, during the formation of the latex binders and/or cure thereof, formaldehyde is typically generated due often to the existance of formaldehyde generating monomers. From an environmental standpoint, latexes containing formaldehyde are undesirable.

SUMMARY OF THE INVENTION

The present invention relates to a latex binder containing very low levels of formaldehyde and generally is made from one or more conjugated diene monomers and one or more vinyl-substituted aromatic monomers with effective amounts of a $\beta$-ketoester of formula I and, optionally, one or more ester monomers, optionally vinyl chloride or vinylidene monomers, and optionally various stabilizer monomers. The latexes are generally free of crosslinking agents and, surprisingly, have good stability, that is, very low levels of coagulation.

DETAILED DESCRIPTION OF THE INVENTION

The binder-forming monomers of the present invention forming the emulsion or latex binder composition (i.e., an aqueous suspension of a copolymer) are generally well known to the art and to the literature and include at least a conjugated diene monomer and a vinyl-substituted aromatic monomer. Optional monomers include various esters, vinyl chloride or vinylidene chloride, various stabilizing monomers, and the like. The conjugated diene monomers generally contain from about 4 to 8 carbon atoms, and desirably from 4 to 6 carbon atoms. Examples of specific diene monomers include piperylene, isoprene, 2,3-dimethyl-1,3-butadiene, and preferably 1,3-butadiene. Mixtures of two or more conjugated dienes can also be utilized. Considering the vinyl-substituted aromatic monomers which can be utilized in association with the conjugated dienes to form copolymers, they generally have from 8 to about 12 total carbon atoms. Specific examples include alpha methyl styrene, p-tertiary butyl styrene, methyl vinyl toluene, p-vinyl toluene, 3-ethyl styrene, and the like, with styrene being preferred. Mixtures of two or more vinyl-substituted aromatic monomers can also be utilized. The amount of the vinyl-substituted aromatic monomers is generally from about 10 parts to about 90 parts by weight, desirably from about 30 to about 70, and preferably from about 50 to about 65, based upon the total weight of vinyl-substituted aromatic and conjugated diene monomers. Thus, the amount of the one or more conjugated diene monomers which can be utilized generally ranges from about 10 to about 90, desirably from about 30 to about 70, and preferably from about 35 to about 50 parts by weight.

Suitable esters include the various alkyl (meth)acrylate and hydroxyl derivatives thereof, wherein the alkyl portion has from 1 to 10 carbon atoms with specific examples including butyl acrylate, 2-ethylhexyl acrylate, propyl acrylate, ethyl acrylate, hydroxyethyl acrylate, hydroxyethyl methacrylate, hydroxmethyl acrylate, hydroxymethyl methacrylate, and the like. The amount of such ester monomers are generally from about 0.1 to about 30 parts by weight, and preferably from about 0.5 to about 20 parts by weight for every 100 parts by weight of the one or more vinyl substituted aromatic and conjugated diene monomers.

Optionally, vinyl chloride and vinylidene chloride monomers or combinations thereof can be utilized in amounts of from about 0.1 up to about 35 parts by weight and preferably from about 5 parts to about 20 parts by weight for every 100 parts by weight of the one or more vinyl-substituted aromatics and conjugated diene monomers.

Examples of stabilizer monomers (e.g., colloidal) include various unsaturated acid and amide monomers having a total of from about 3 to about 12 carbon atoms. The amount of such monomers is generally from about 0.1 to about 10 parts by weight, desirably from about 0.5 to about 5 parts, and preferably from about 2 to about 5 parts by weight for every 100 parts by weight of the one or more conjugated diene and vinyl-substituted aromatic monomers. Examples of suitable monomers include acrylic acid, methacrylic acid, maleic acid, fumaric acid, itaconic acid, (meth) acrylamide and combinations thereof. Various organic salts such as sodium styrene sulfonate and 3-sulfopropyl(meth)acrylate salt of sodium or potassium can also be used.

The above monomers are polymerized in the presence of water to form the latex binder of the present invention in accordance with conventional emulsion polymerization procedures and techniques. In addition to these monomers, free-radical initiators, optional chain transfer agents, various emulsifiers (such as anionic surfactants), chelating agents, and the like can be utilized as set forth in U.S. Pat. No. 5,166,259, to Schmeing and White, which is hereby fully incorporated by reference.

The free-radical initiators utilized to polymerize the various above latex binder-forming monomers include sodium persulfate, ammonium persulfate, potassium persulfate, and the like. Other free-radical initiators can be utilized which decompose or become active at the temperature utilized during polymerization such as various peroxides, e.g., cumene hydroperoxide, dibenzoyl peroxide, diacetyl peroxide, dodecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxidicarbonate, various azo initiators such as azobisdimethyivaleronitrile, 2,2'-azobisisobutyronitrile, 2,2'-azobis(2-amidinopropane) dihydrochloride, 2,2'-azobis-2-methyl-butyronitrile, 2,2'-azobis(methylisobutyrate), and the like, and mixtures thereof. The amount of the free-radical initiators is generally from about 0.25 to about 2.0, and preferably from about 0.5 to about 1.5 parts by weight for every 100 parts by weight of the total monomers.

Optional chain transfer agents include mercaptans such as the alkyl and/or aralkyl mercaptans having from 8 to about 18 carbon atoms and preferably from about 12 to about 14 carbon atoms. The tertiary alkyl mercaptans having from 12 to 14 carbon atoms are highly preferred. Examples of suitable mercaptans include n-octyl mercaptan, n-dodecyl mercaptan, t-octyl mercaptan, t-dodecyl mercaptan, tridecyl mercaptan, tetradecyl mercaptan, hexadecyl mercaptan, and the like, as well as mixtures thereof. The amount of the chain transfer agent utilized is generally from about 0.01 to about 5 parts by weight and desirably from about 0.1 to about 1.0 part by weight for every 100 parts by weight of the total monomers.

The emulsifiers can generally be any surfactant, soap, or the like which are well known to the art and to the literature and stable at the pH of the present latexes, that is, from about 1.5 to about 9.0, and include the various alkyl sulfates, the various alkyl sulfosuccinates, the various alkyl aryl sulfonates, the various alpha olefin sulfonates, the various quaternary ammonium salts, the various amine salts, the various fatty or resin acid salts, nonyl or octyl phenol reaction products of ethylene oxide and the like. The alkyl portion of the various emulsifiers generally has from 8 to 18 carbon atoms. Examples of suitable surfactants which desirably are anionic include sodium lauryl sulfate, various sodium sulfosuccinates such as sodium dimethylamyl sulfosuccinate, e.g., Aerosol MA80, sodium dodecyl diphenyl oxide disulfonate, and the like. Naturally, an amount of an emulsifier is utilized to obtain an aqueous emulsion of the various monomers. Such an amount is typically from about 0.5 to about 5 or 6 parts by weight for every 100 parts by weight of the monomers. Other surfactants can be utilized such as those set forth in Surface Active Agents, Schwartz and Perry, Vol. I, Interscience Publishers, Inc., New York, 1958; Surface Activity, Moilliet, Collie and Black, D. Van Nostrand Company, Inc., New York, 1961; Organic Chemistry, Fieser and Fieser, D.C. Heath and Company, Boston, 1944; and The Merck Index, Seventh Edition, Merck & Co., Inc., Rahway, N.J., 1960, all of which are hereby fully incorporated by reference.

Chelating agents can be utilized during polymerization to tie up various metal impurities as well as to achieve a uniform polymerization. The amounts of such chelating agents are generally small, such as from about 0.01 to about 0.25 parts by weight for every 100 parts by weight of the total weight of the monomers. Examples of suitable chelating agents include ethylene diamine tetra-acetic acid, nitrilotriacetic acid, citric acid, and their ammonium, potassium, and sodium salts.

Another additive which can be utilized is that which imparts good solvent resistance to the latex binder by formation of crosslinking sites through only unsaturated groups and thus excludes compounds which crosslink through functional groups such as those having N-methylol functionality. Such solvent-resistant additives include divinyl benzene, diisopropenyl benzene, ethylene glycol dimethacrylate, and the like. The use of this component, which is optional, can range from about 0.1 to about 3 parts by weight, and desirably from about 0.2 to about 2 parts by weight based upon 100 parts by weight of the total monomers.

It is an important aspect of the present invention to utilize a monomer of formula I, that is, $\alpha\beta$-ketoester derivative of a vinyl ester, which produces a latex binder having very low and often undetectable amounts of formaldehyde:

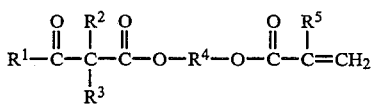

wherein $R^1$ is generally an alkyl having from 1 to 6 carbon atoms, with methyl being preferred; wherein $R^2$ and $R^3$, independently, is ally]., or an alkyl having from 1 to 12 carbon atoms, or an alkyl-substituted aromatic having from 7 to 15 carbon atoms such as benzyl, and preferably is hydrogen; wherein $R^4$ is an alkylene having from 1 to 4 carbon atoms, with ethylene being preferred; and wherein $R^5$ is hydrogen or an alkyl having from 1 to 4 carbon atoms, with methyl being preferred. In a very preferred compound of the present invention, $R^1$ is $CH_3$, $R^2$ and $R^3$ are hydrogen, $R^4$ is $C_2H_4$, and $R^5$ is $CH_3$. That is, the compound is acetoacetoxyethyl methacrylate (AAEM) which has a structure set forth in formula II:

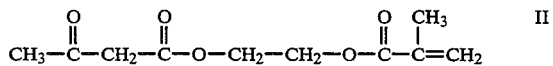

The amount of the $\beta$-ketoester derivative of a vinyl ester utilized in the present invention is generally from about 0.05 to about 7.0 parts; desirably from about 0.10 to about 5.0 parts; and preferably from about 0.25 to about 1.0 parts by weight per 100 parts by weight of the conjugated diene and the vinyl-substituted aromatic monomers.

The various latex-forming monomers of the present invention are polymerized by free radicals by any conventional method including batch, incremental, or continuous, in the presence of an effective amount of water to enable the formation of an emulsion as well as proper mixing of the various additives, heat transfer, and the like. Polymerization is generally carried out from about 54° C. to about 94° C., and desirably from about 65° C. to about 77° C. Polymerization is generally conducted in an acidic medium when acidic monomers are utilized and the pH of the latex binder is generally from about 1.5 to about 6.5, with from about 2.0 to about 4.0 being preferred. The amount of solids, that is, the copolymer or binder, is generally from about 40 to about 60, and preferably from about 45 to about 55 percent by weight based upon the total weight of the binder and the remaining ingredients, for example, water. The average particle size of the binders after filtering is generally from about 1,000 to about 3,000 Å and desirably from about 1,200 to about 2,000 Å.

It is an important aspect of the present invention that the latex binders are made essentially free of or absent of any crosslinking agents reacting through functional groups such as compounds having N-methylol functionality or ethers thereof inasmuch as formaldehyde is generally created. Examples of such compounds which are not utilized in the present invention are generally N-methylol-functional ethylenically unsaturated monomers including N-methylolamides of ethylenically unsaturated carboxylic acids having 3-10 carbons, such as N-methylolacrylamide, N-methylolmethacrylamide, N-methylolmaleimide, N-methylolmaleinamic acid, N-methylol-maleinamic acid esters, N-methylolamides of the vinyl aromatic acids such as N-methylol-p-vinylbenzamide, and the like. Also essentially excluded or absent from the present latex-forming monomers are mixtures of various N-methylol-functional monomers such as mixtures of N-methylolacrylamide and acrylamide and mixtures of N-methylolmethacrylamide and methacrylamide. If any of such compounds are utilized, the amount is very minute, such as 0.1 part or less and desirably 0.05 parts or less by weight based upon 100 parts by weight of the total monomers or effective amounts which yield generally 10 parts or less per million and desirably 5 parts or less, or 3 parts or less, or even 2 parts or less of formaldehyde per million of latex binder. The binders of the present invention are thus essentially free of any chemical functional group crosslinks, although perhaps contain very minor inherent crosslinking obtained by the reaction of the various unsaturated, non-functional groups such as those in divinyl benzene. Thus, no cure of the binders is necessary once the latex binder has been applied to an article.

An important advantage of the latex binders is that they, as well as the binder per se, have very low amounts of aldehyde therein and generally are aldehyde-free. That is, the amount of aidehyde, e.g., formaldehyde, is generally 10 parts or less, desirably 5 parts, 3 parts, or 2 parts or less, and preferably 1 part or 0.7 part or less per million parts by weight of the latex binder composition. Another unexpected advantage is that the latex binders have good storage stability in that the aldehyde content thereof essentially remains the same after one day, one week, two weeks, three weeks, and even four weeks. For example, after 28 days, the amount of aldehyde in the latex binder composition is still appreciably the same, i.e., within 5 or 7 percent of the original or initial aldehyde content. Moreover, the amount of aldehyde in the binder per se is also the same as the ranges set forth above, i.e., 10 parts or less by weight based upon one million parts by weight of binder.

The latex binder also has good coagulation stability. Thus, very low levels of coagulant, especially fine-size coagulant such as that retained on 325 Tyler mesh, exist after filtering of the latex, that is, 0.1 percent or less, desirably 0.05 percent or less, more desirably 0.02 percent or less, and preferably 0.01 percent or less by weight based upon the total weight of the latex solids.

The latex binder of the present invention has many applications and can be utilized on cellulosic materials such as paper, e.g., paper towels, various paper tapes, paper containers, and the likes, but is particularly well suited for high-quality paper such as #1 and #3 coated grades commonly used for annual reports, magazines, and the like. The latex binder can also be applied to nonwoven substrates such as nonwoven fibers, e.g., polyester, polypropylene, rayon, or nylon, to nonwoven textiles such as mats, to carpet backings, to various disposable products for use in the medical industry such as face masks, gowns, gloves, and the like.

Once the binder latexes of the present invention have been applied to a substrate, they are generally not cured inasmuch as they do not contain a crosslinking agent, but can be heated at mild temperatures as from about 40° C. to about 100° C., desirably from about 50° C. to about 70° C. to remove the water from the aqueous dispersion thereby leaving the binder upon the substrate.

The formaldehyde-free latex binders and subsequent water-evaporated binders of the present invention are very suitable for mixing with cellulose coatings and preferably paper-coating compositions inasmuch as when they are applied to a cellulose substrate and particularly to a high-grade paper substrate, a very smooth, high-gloss sheet is produced. Any paper-coating composition can be utilized as is known to the art and to the literature, and the same generally include various fillers such as high brightness clay pigments, calcium carbonate, titanium dioxide, small amounts of sodium hydroxide to control the pH, small amounts of calcium stearate to act as a lubricant, water, sodium polyacrylic acid to act as a dispersant for the clay, starch, for example, oxidized starch, protein binders such as soybean protein, polyvinyl alcohol binders, and the like. From about 4 to about 25 parts by weight and desirably from about 5 to about 20 parts by weight of the latex binder solids, i.e., dry binder, per 100 parts of filler (e.g., clay, calcium carbonate, titanium dioxide, etc.) is generally utilized and the same are mixed along with the above-noted other paper coating additives in any conventional mixer, e.g., a Cowles blade mixer or a ball mill. The paper-coating composition containing a small amount of the latex binder of the present invention is then coated on a paper substrate as by using an air knife coater, a blade coater, or a roll coater. The substrate is then dried in a conventional hot-air oven and/or infrared drying oven. The paper is then generally supercalendered at elevated temperatures as from about 55° C. to about 85° C., with from about 60° C. to about 70° C. being desired, and at high pressure, as from about 800 to 1,500 pounds per linear inch, and desirably from about 1,100 to about 1,300 pounds per linear inch, to yield a smooth sheet with high gloss.

The invention will be better understood by reference to the following examples which serve to illustrate the invention, but not to limit the same.

Apparatus

A one-gallon, stainless steel pressure reactor equipped with monomer addition ports, stirrer, and temperature and pressure measurement devices was used. Cooling was provided by an external water bath of sufficient volume/flow rate to keep the contents of the polymerization vessel between 71° C.±2° C.

| EXAMPLE 1A | |
|---|---|
| Latex Binder Recipe | Weight |
| Deionized water | 850 g |
| Disodium dodecyl diphenyl oxide disulfonate | 3.3 g |
| Itaconic acid | 24 g |
| Styrene | 7 g |
| Potassium persulfate | 57 g |
| in deionized water | 200 g |
| Styrene | 800 g |
| Butadiene | 630 g |
| Acetoacetoxy ethyl methacrylate | 80 g |
| Acrylic acid | 37 g |
| Dodecyl mercaptan | 10 g |
| Disodium dodecyl diphenyloxide disulfonate | 20 g |
| Deionized water | 400 g |
| Sodium hydroxide | 8 g |
| dissolved in deionized water | 60 g |
| Defoamer | 3 g |

The deionized water (850 g) was charged to the vessel together with 3.3 g of the disodium dodecyl diphenyl oxide disulfonate, 24 g of the itaconic acid and 57 g of the styrene. The reactor was alternatively purged with nitrogen and evacuated three times. The temperature of the external bath was raised to 71° C. The solution of 7 g potassium persulfate in 200 g deionized water was then added.

A mixture of monomers was then added to the reactor continuously over a period of seven hours: 800 g styrene, 630 g butadiene, 80 g acetoacetoxy ethyl methacrylate, and 37 g acrylic acid. Additions of the chain transfer agent dodecyl mercaptan (10 g) and further soap disodium dodecyl diphenyloxide disulfonate (20 g) were also added to the reactor over a period of seven hours together with further deionized water (400 g). The reactor was then heated at 71° C. until a conversion of monomer to polymer of 98 percent was achieved.

At this point, the 8 g sodium hydroxide dissolved in 60 g deionized water was added together with a small amount of defoamer (3 g), such as "Foamaster VT" (Henkel Corporation). The polymer latex obtained was then subjected to steam distillation under a vacuum in a process well known in polymer latex manufacture. The latex binder was generally treated in such a manner to reduce residual monomers and other volatile components to acceptably low levels. At this point, the latex binder was passed through a 325 Tyler mesh filter to remove large agglomerated particles, and a general biocide was added (e.g., "Proxel GXL").

| Properties | |
|---|---|
| Total solids content: | 51 percent |
| pH: | 6.5 |
| Surface tension: | 42 dynes/cm |
| Brookfield viscosity: | 160 cps |
| Particle size: | approx 1700 Å |
| Coagulation collected on 325 Tyler mesh: | 3.0 grams |

The above binder made in accordance with the present invention contained less than 0.7 part by weight of formaldehyde per million parts by weight of the latex binder. The amount of formaldehyde after 28 days of aging was also less than 0.7 parts per million.

COMPARATIVE EXAMPLE 1B

When the same latex recipe as set forth above was polymerized in a similar manner utilizing essentially the same recipe, but deleting the AAEM and substituting therefor 2.5 parts by weight of N-methylol acrylamide, the formaldehyde content of the resulting latex was 325 parts per million! That utilization of AAEM would produce essentially zero amount of formaldehyde as in Example 1, in comparison with the use of N-methylol acrylamide, was unexpected inasmuch as when no N-methylol acrylamide and no AAEM was utilized, as in comparative Example 1C, 25 ppm of formaldehyde was nevertheless produced.

COMPARATIVE EXAMPLE 1C

When the same latex recipe was polymerized under the same conditions as set forth in Example 1A with no N-methylol acrylamide and no AAEM, the amount of formaldehyde was 25 parts per million.

COMPARATIVE EXAMPLE 1D

When the same latex recipe was polymerized under the same conditions as set forth in Example 1A with 2.0 parts by weight of N-methylol acrylamide and 2.0 parts ]by weight of AAEM, the amount of formaldehyde formed was approximately 22 parts per million.

EXAMPLE 2A

Deionized water (1070 g) was charged to the polymerization vessel together with Sulfonate OA5 surfactant (23 g), itaconic acid (24 g), and styrene (58 g). The reactor was flushed with nitrogen and heated to 60° C. A solution of sodium persulfate (11 g) in deionized water (100 g) was added to the reactor. A monomer mixture comprising styrene (860 g), butadiene (650 g) and acetoacetoxyethyl methacrylate (38 g) was added to the reactor over a period of five hours. Additions of chain transfer agent, t-nonyl mercaptan (6 g) and further surfactant, Sulfonate OA5 (10 g), as well as deionized water (173 g) were made over 5.5 hours. The reactor was then heated at 7° C. until conversion of monomer to polymer was 97–98 percent. Subsequently, the latex binder was treated in the manner as set forth in Example 1A.

| Properties | |
|---|---|
| Total solids content: | 49.5 percent |
| pH: | 7.5 |
| Surface tension: | 48 dynes/cm |
| Brookfield viscosity: | 220 cps |
| Particle size: | approx 1250 Å |
| Coagulation collected on 325 Tyler mesh: | 4.0 grams |
| HCHO Content: | <0.7 ppm* |

*This was the detection limit of the test and, inasmuch as no formaldehyde was detectable, the amount thereof was less. After 28 days of aging, the amount of formaldehyde was still less than 0.7 parts per million.

COMPARATIVE EXAMPLE 2B

When the same recipe as in Example 2A was utilized under the same conditions thereof, except that 2.5 parts of N-methylol acrylamide was utilized in lieu of AAEM, the resulting latex contained 250 parts per million of formaldehyde !

COMPARATIVE EXAMPLE 2C

When the recipe of Example 2A was made in a manner as set forth therein utilizing no N-methylol acrylamide and no amount of AAEM, the amount of formaldehyde produced was 10 parts per million.

From the above data, it should be apparent that it was unexpected that essentially zero formaldehyde would be produced whereas inherently, for example, in comparative Examples 1C and 2C, significant amounts of formaldehyde always existed.

The above 1A recipe containing AAEM was then mixed with the following paper-coating composition.

| Paper Coating Composition (Dry parts) | |
|---|---|
| Dispex N-40 (Sodium polyacrylic acid) | 0.25 g |
| Sodium hydroxide | 0.10 g |
| Hydra gloss 90 (high brightness clay pigment) | 80.0 g |
| Carbitol 35 (calcium carbonate pigment) | 20.0 g |
| CMC (carboxymethyl cellulose) | 0.20 g |
| Polymer latex binder | 10.00 g |
| Calcium stearate | 0.80 g |
| Water (to produce a total solids of 60 percent) | |

When the above recipe was well mixed and dried on a paper substrate, at 204° C. for 5 seconds, and then subsequently super-calendered at 150° F. at 1,250 pounds per linear inch to provide a smooth sheet with high gloss and the paper coat weight was 10 pounds per 3,300 sq. ft., the following properties were obtained:

| | |
|---|---|
| Dry Pick (VVP) = | 24 kilopoise cm/sec. |
| Wet Pick[1] = | 3.0 |
| TAPPI Gloss[2] = | 73 |

-continued

| | |
|---|---|
| Brightness[2] = | 82 |
| Ink Gloss[2] = | 80 |

[1] A visually rated test was utilized: 1 = good, 7 = poor.
[2] TAPPI (Technical Association of the Pulp and Paper Industry) standard tests which do not have units of measurement. They utilize a standard of 100 (being the highest obtained. Instruments are calibrated internally (for gloss, a highly polished ceramic plate is used as equal to 100 gloss).

The above paper coating composition data discloses that typical paper coating properties are not adversely affected.

While in accordance with the Patent Statutes, the best mode and preferred embodiment has been set forth, the scope of the invention is not limited thereto, but rather by the scope of the attached claims.

What is claimed is:

1. A latex binder composition, which comprises; a binder dispersed in water and made from monomers comprising from 10 to 90 parts by weight of one or more monomers of a conjugated diene having from 4 to 8 carbon atoms and from 10 to 90 parts by weight of one or more monomers of a vinyl-substituted aromatic having from 8 to 12 carbon atoms based upon 100 total parts by weight of said vinyl-substituted aromatic and said conjugated diene monomers, optionally from about 0.1 to about 30 parts by weight based upon 100 parts by weight of said one or more conjugated diene and vinyl-substituted aromatic monomers of an alkyl (meth)acrylate ester or hydroxy derivative thereof wherein said alkyl group has from 1 to 10 carbon atoms, optionally from about 0.1 to about 35 parts by weight based upon 100 parts by weight of said one or more conjugated diene and vinyl-substituted aromatic monomers of a vinyl chloride monomer or a vinylidene chloride monomer, or combinations thereof, optionally, from about 0.1 to about 10 parts by weight per 100 parts by weight of said one or more conjugated dienes and said vinyl-substituted aromatic monomers of one or more unsaturated acid or amide monomers having a total of from 3 to 12 carbon atoms, and from about 0.05 to about 7 parts by weight per 100 parts by weight of said one or more conjugated diene and said vinyl-substituted aromatic monomers of a β-ketoester derivative of a vinyl ester having the formula

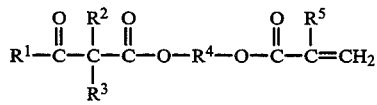

wherein $R^1$ is an alkyl having from 1 to 6 carbon atoms, $R^2$ and $R^3$, independently, is hydrogen, or an alkyl having from 1 to 12 carbon atoms, or an alkyl-substituted aromatic having from 7 to 15 carbon atoms, or allyl, wherein $R^4$ is an alkylene having from 1 to 4 carbon atoms, wherein $R^5$ is hydrogen or an alkyl having from 1 to 4 carbon atoms, and wherein said latex binder contains less than 10 parts by weight of formaldehyde per million parts by weight of said latex binder.

2. A latex binder according to claim 1, wherein said binder contains from about 0.5 to about 20 parts by weight of said (meth)acrylate alkyl ester, or from about 5 to about 20 parts by weight of said vinyl chloride, or said vinylidene chloride, or combinations thereof.

3. A latex binder according to claim 1, wherein the amount of said β-ketone derivative compound is from about 0.10 to about 5.0 parts by weight, wherein said conjugated diene monomer has from 4 to 6 carbon atoms, wherein the amount by weight of said conjugated diene monomer is from about 30 to about 70 parts by weight and wherein the amount of said vinyl-substituted aromatic monomer is from about 30 to about 70 parts by weight, and wherein said latex binder contains less than 5 parts by weight of formaldehyde per million parts by weight of said latex binder.

4. A latex binder according to claim 3, wherein $R^1$ is methyl, wherein $R^2$ and $R^3$ are hydrogen, wherein $R^4$ is ethylene, wherein $R^5$ is methyl, wherein said conjugated diene is butadiene, where the amount of said butadiene is from about 35 to about 50 parts by weight, wherein said vinyl-substituted aromatic is styrene, and wherein the amount of said styrene is from about 50 to about 65 parts by weight.

5. A latex binder according to claim 4, wherein said binder contains said unsaturated acid or amide and wherein the amount thereof is from about 0.5 to about 5 parts by weight.

6. A latex binder according to claim 5, wherein said acid monomer is acrylic acid, itaconic acid, or combinations thereof.

7. A latex binder according to claim 1, wherein said latex binder contains less than 2 parts by weight of formaldehyde per million parts by weight of said latex binder.

8. A latex binder according to claim 1, wherein the amount of formaldehyde in the latex binder is 10 parts or less by weight per million parts by weight of said latex binder after 28 days.

9. A latex binder according to claim 4, wherein the amount of formaldehyde in the latex binder is 3 parts or less by weight or less per million parts by weight of said latex binder after 28 days.

10. A latex binder according to claim 5, wherein the amount of formaldehyde in the latex binder is 1 part or less by weight per million parts by weight of said latex binder after 28 days.

11. A latex binder according to claim 1, wherein the amount of binder retained on a 325 Tyler mesh screen is 0.1 percent by weight or less based upon the total weight of the binder when said binder is filtered through said screen.

12. A latex binder according to claim 5, wherein the amount of binder retained on a 325 Tyler mesh screen is 0.05 percent by weight or less based upon the total weight of the binder when said binder is filtered through said screen.

13. A binder, comprising:

the reaction product comprising at least one or more monomers of a conjugated diene having from 4 to 8 carbon atoms, one or more vinyl-substituted aromatic monomers having from 8 to 12 carbon atoms, and a β-ketoester derivative of a vinyl ester having the formula:

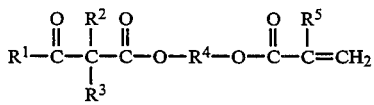

wherein $R^1$ is an alkyl having from 1 to 6 carbon atoms, $R^2$ and $R^3$, independently, is hydrogen, or an alkyl having from 1 to 12 carbon atoms, or an alkyl-substituted aromatic having from 7 to 15 carbon atoms, or allyl, wherein $R^4$ is an alkylene having from 1 to 4 carbon atoms, and wherein $R^5$ is hydrogen or an alkyl having from 1 to 4 carbon atoms, the amount of said one or more conjugated diene monomers being from about 10 to about 90 parts by weight and the amount of said one or more vinyl-substituted aromatic monomers being from about 90 to about 10 parts by weight based upon 100 total parts by weight of said one or more conjugated dienes and said vinyl-substituted aromatic monomers, the amount of said $\beta$-ketoester derivative being from about 0.05 to about 7 parts by weight per 100 parts by weight of said one or more conjugated dienes and said vinyl-substituted aromatic monomers, and wherein said binder contains less than 10 parts by weight of formaldehyde per million parts by weight of said latex binder.

14. A binder, according to claim 13, wherein the amount of said $\beta$-ketone derivative compound is from about 0.10 to about 5.0 parts by weight, wherein said conjugated diene monomer has from 4 to 6 carbon atoms, wherein the amount by weight of said conjugated diene monomer is from about 30 to about 70 parts by weight and wherein the amount of said vinyl-substituted aromatic monomer is from about 30 to about 70 parts by weight, and wherein said binder contains less than 5 parts by weight of formaldehyde per million parts by weight of said binder after 28 days.

15. A binder, according to claim 14, wherein $R^1$ is methyl, wherein $R^2$ and $R^3$ are hydrogen, wherein $R^4$ is ethylene, wherein $R^5$ is methyl, wherein said conjugated diene is butadiene, wherein the amount of said butadiene is from about 35 to about 50 parts by weight, wherein said vinyl-substituted aromatic is styrene, wherein the amount of said styrene is from about 50 to about 65 parts by weight, and wherein said binder contains less than 2 parts by weight of formaldehyde per million parts by weight of said binder after 28 days.

16. A binder, according to claim 13, wherein the amount of binder retained on a 325 Tyler mesh screen is 0.1 percent by weight or less based upon the total weight of the binder when said binder is filtered through said screen.

17. A binder, according to claim 15, wherein the amount of binder retained on a 325 Tyler mesh screen is 0.05 percent by weight or less based upon the total weight of the binder when said binder is filtered through said screen.

18. A coated cellulose substrate, comprising: the cellulose substrate, and a mixture of a binder and a paper coating composition bonded to said substrate, said binder comprising the composition of claim 13.

19. A coated paper substrate, comprising: the paper substrate, and a mixture of a binder and a paper coating composition bonded to said substrate, said binder comprising the composition of claim 17.

20. A nonwoven substrate, comprising a substrate having nonwoven fibers and a binder bonding said fibers together, said binder comprising the binder of claim 13.

21. A nonwoven substrate, comprising a substrate having nonwoven fibers and a binder bonding said fibers together, said binder comprising the binder of claim 15.

22. A paper coating composition mixture containing a binder therein which is made by an emulsion polymerization comprising at least from about 10 parts to about 90 parts by weight of one or more monomers of a conjugated diene having from 4 to 8 carbon atoms and from about 10 parts to about 90 parts by weight of one or more vinyl-substituted aromatic monomers having from 8 to 12 carbon atoms based upon 100 total parts by weight of said conjugated diene monomers and said vinyl-substituted aromatic monomers, the improvement comprising using from about 0.05 to about 7 parts by weight per 100 parts by weight of said one or more conjugated diene and said vinyl-substituted aromatic monomers of a $\beta$-ketoester derivative of a vinyl ester having the formula:

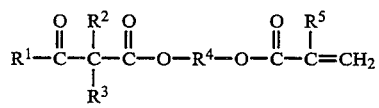

wherein $R^1$ is an alkyl having from 1 to 6 carbon atoms, $R^2$ and $R^3$, independently, is hydrogen, or an alkyl having from 1 to 12 carbon atoms, or an alkyl-substituted aromatic having from 7 to 15 carbon atoms, or allyl, wherein $R^4$ is an alkylene having from 1 to 4 carbon atoms, and wherein $R^5$ is hydrogen or an alkyl having from 1 to 4 carbon atoms.

23. A paper coating composition according to claim 22, wherein said composition contains less than 2 parts by weight of formaldehyde per million parts by weight of said binder after 28 days.

24. Nonwoven fibers bonded together by a binder which is made by an emulsion polymerization comprising at least from about 10 parts to about 90 parts by weight of one or more monomers of a conjugated diene having from 4 to 8 carbon atoms and from about 10 parts to about 90 parts by weight of one or more vinyl-substituted aromatic monomers having from 8 to 12 carbon atoms based upon 100 total parts by weight of said conjugated diene and said vinyl-substituted aromatic monomers, the improvement comprising using from amour 0.05 to about 7 parts by weight per 100 parts by weight of said one or more conjugated dienes and said vinyl-substituted aromatic monomers of a $\beta$-ketoester derivative of a vinyl ester having the formula:

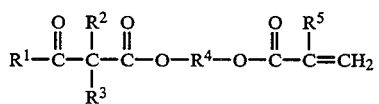

wherein $R^1$ is an alkyl having from 1 to 6 carbon atoms, $R^2$ and $R^3$, independently, is hydrogen, or an alkyl having from 1 to 12 carbon atoms, or an alkyl-substituted aromatic having from 7 to 15 carbon atoms, or allyl, wherein $R^4$ is an alkylene having from 1 to 4 carbon atoms, and wherein $R^5$ is hydrogen or an alkyl having from 1 to 4 carbon atoms.

25. Non-woven fibers bonded together by a binder according to claim 24, wherein said composition contains less than 3 parts by weight of formaldehyde per million parts by weight of said binder after 28 days.

* * * * *